US006271995B1

(12) United States Patent
Fontana, Jr. et al.

(10) Patent No.: US 6,271,995 B1
(45) Date of Patent: Aug. 7, 2001

(54) MAGNETIC HEAD FOR RECORDING WITH ULTRA LOW FORCE

(75) Inventors: Robert Edward Fontana, Jr., San Jose; Linda Hope Lane, Gilroy; Mason Lamar Williams, III; Celia Elizabeth Yeack-Scranton, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/259,370

(22) Filed: Jun. 14, 1994

Related U.S. Application Data

(63) Continuation of application No. 07/935,000, filed on Aug. 25, 1992, now abandoned.

(51) Int. Cl.$^7$ ........................................................... G11B 5/48
(52) U.S. Cl. ............................................................. 360/244.3
(58) Field of Search ................................... 360/103, 104, 360/244.3

(56) References Cited

U.S. PATENT DOCUMENTS

| | | | |
|---|---|---|---|
| 3,849,800 | 11/1974 | Cuzner et al. | 360/97 |
| 3,975,772 | 8/1976 | Lin | 360/113 |
| 4,190,872 | 2/1980 | Jones, Jr. et al. | 360/125 |
| 4,251,841 | 2/1981 | Jacobs | 360/122 |
| 4,624,048 | 11/1986 | Hinkel et al. | 29/603 |
| 4,670,804 | 6/1987 | Kant et al. | 360/102 |
| 4,789,914 * | 12/1988 | Ainslie et al. | 360/104 |
| 4,890,176 * | 12/1989 | Casey et al. | 360/105 |
| 5,010,430 * | 4/1991 | Yamada et al. | 360/103 |
| 5,014,145 * | 5/1991 | Hosokawa et al. | 360/104 |
| 5,041,932 | 8/1991 | Hamilton | 360/104 |
| 5,055,969 * | 10/1991 | Putnam | 360/103 |

FOREIGN PATENT DOCUMENTS

| | | |
|---|---|---|
| 0 179 653 A1 | 10/1985 | (EP) . |
| 0 430 407 A2 | 9/1990 | (EP) . |
| 0 508 565 A3 | 2/1992 | (EP) . |
| 0 540 282 A2 | 10/1992 | (EP) . |
| 59-168968 * | 9/1984 | (JP) ................................... 360/104 |
| 4-289508 | 10/1992 | (JP) ............................. G11B/5/31 |
| WO 86 00456 | 6/1985 | (WO) . |

OTHER PUBLICATIONS

"Contact Perpendicular Recording on Rigid Media" by H. Hamilton, R. Anderson, K. Goodson, *IEEE Transactions on Magnetics*, vol. 27, No. 6, Pt. 2, Nov. 1991, pp. 4921–4926.

(List continued on next page.)

*Primary Examiner*—David Davis
(74) *Attorney, Agent, or Firm*—Altera Law Group, LLC

(57) ABSTRACT

A disk drive assembly in which the suspension and read/write transducer are integrated into a combination assembly and fabricated using thin film deposition techniques thereby producing an assembly which is very low in mass permitting contact recording. In one embodiment, transducers are deposited in a row and column configuration onto a release and support layer covering a wafer substrate having a thickness equal to a desired suspension length. The wafer is separated into a plurality of row sections, with each row section providing one thin film transducer from each column. A second release layer is formed on a separated side on the row section and thin layers of suitable materials are deposited to form a suspension layer including conductive lines extending to the thin film transducers. The first and second release layers are dissolved and the row section is further cut to form the individual combination assemblies. In a second embodiment, the wafer substrate has a thickness equal to the width of the suspension. The transducers deposited on a row are separated by the desired suspension length to produce combination assemblies useful for linear disk drive actuators. The excess portion of the wafer substrate can alternatively be removed by cutting or etching eliminating the requirement for release or support layers.

35 Claims, 8 Drawing Sheets

OTHER PUBLICATIONS

"Vertical Recording Probe Head Made by Horizontal Head Process" by T. J. Beaulieu and D. W. Chapman, *IBM Technical Disclosure Bulletin*, vol. 36, No. 02, Feb. 1993, pp. 267–268.

"A New Approach to Making Thin Films Head–Slider Devices" by Daniel W. Chapman, *IEEE Transactions on Magnetics*, vol. 25, No. 5, Sep. 1989, pp. 3686–3688.

T.J. Beaulieu and D.W. Chapman, "vertical Recording Probe Head Made by Horizontal Head Process," IBM TDB, vol. 36, No. 02, Feb. 1993.

Chapman, D.W., "A New Approach to Making Thin Film Head–Slider Devices," IEEE Trans. on Mag., vol. 25, No. 5, Sep. 1989, pp. 3686–3688.

Chapman, D.W., "A New, Horizontal MR Head Structure," IEEE Trans. on Mag., vol. 25, No. 5, Sep., 1989, pp. 3689–3691.

* cited by examiner

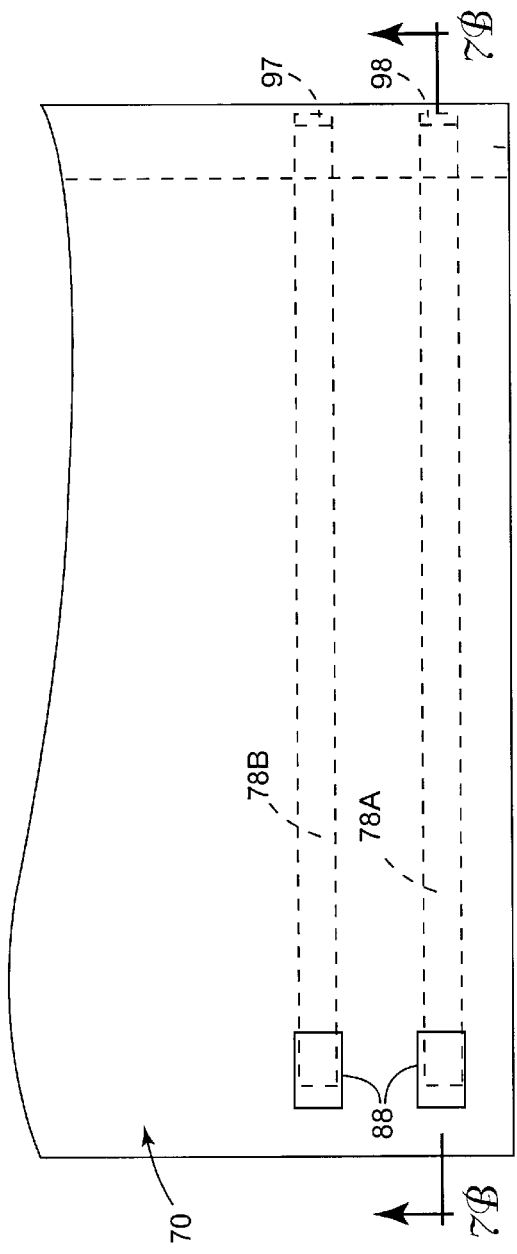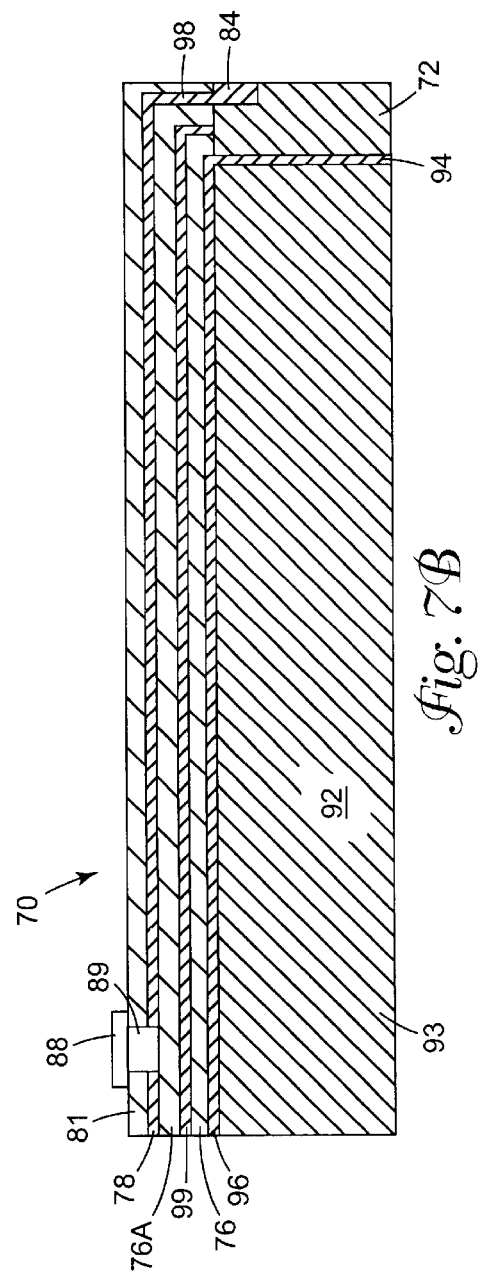

MAGNETIC HEAD FOR RECORDING WITH ULTRA LOW FORCE

This application is a continuation, division, of application Ser. No. 07/935,000, filed Aug. 25, 1992, now abandoned.

DOCUMENTS INCORPORATED BY REFERENCE

Jones Jr. et al, U.S. Pat. No. 4,190,872, issued on Feb. 26, 1980 and assigned to the assignee of the present invention, to show a thin film inductive transducer useful with the present invention.

Lin, U.S. Pat. No. 3,975,772 issued on Aug. 17, 1976 and assigned to the assignee of the present invention, to show a thin film magnetoresistive head useful with the present invention.

Hinkel et al, U.S. Pat. No. 4,624,048, issued on Nov. 25, 1986 and assigned to the assignee of the present invention, to show a process for making magnetic head sliders useful with the present invention.

Jacobs, U.S. Pat. No. 4,251,841, issued on Feb. 17, 1981 and assigned to the assignee of the present invention, to show a wafer-substrate material useful with the present invention.

Cuzner, et al, U.S. Pat. No. 3,849,800, issued on Nov. 19, 1974 and assigned to the assignee of the present invention, to show a rotary actuator useful in a drive using the present invention.

TECHNICAL FIELD

The present invention relates to moving magnetic storage devices and their recording elements and more particularly to combination transducer-suspension structures which are suitable for batch fabrication and a method for making the structures.

BACKGROUND OF THE INVENTION

The quest for an efficient recording scheme for disk files continues to be one of the highest priorities. Increasing data storage density and the need for apparatus having extended lives drive this search.

Disk files are information storage devices which utilize at least one rotatable data storage disk with concentric data tracks containing data information, a transducer for reading the data from or writing the data to the various tracks, a slider for holding the transducer adjacent to the track generally in a flying mode above the media, a suspension for resiliently holding the slider and the transducer over the tracks, and a positioning actuator connected to the combination for moving the transducer to the desired track and maintaining the transducer over the track center line during a read or a write operation. The transducer is attached to the air bearing slider which supports both above the track of the disk by a cushion of air that is generated by the rotating disk or in contact with the disk. A suspension provides a high spring stiffness and dimensional stability between the slider and the actuator arm. The suspension is required to maintain the transducer and the slider adjacent to the data surface of the disk with as low a loading force as possible. The actuator positions the transducer over the correct track according to the data desired on a read operation or to the correct track for placement of the data during a write operation. The actuator is controlled to position the transducer over the correct track by shifting the combination suspension-transducer-slider assembly generally transverse to the motion of the track.

In conventional disk drives, the transducer and the slider are formed separately from the suspension and then attached through an operator controlled precision operation. The parts are small and the positioning of each relative to the other must be exact. The transducer must be exactly positioned relative to the track which in turn means that the suspension must be exactly positioned onto the slider. The suspension must provide flexibility and pitch and roll motion for the slider relative to the direction of motion of the rotating disk and yet provide resistance to yaw motion. Any error in the placement of the suspension relative to the slider results in the destruction of both pieces. The conductor leads are directed along the suspension and connected to an amplifier placed on the suspension or on the actuator. The conductor leads must not add to the spring stiffness of the slider while providing good electrical interconnection. The conductor leads are generally bonded by soldering, for instance, to both the transducer output leads and the amplifier by an operator. Again, errors can cause destruction of the entire combination.

The U.S. Pat. No. 4,670,804 to Kant et al. assigned to the assignee of the present invention, describes a slider-suspension assembly that includes flexible sheets of material for the suspension to which the conductors for the transducer are deposited and which support the slider and the transducer combination. The stainless steel suspension of the prior art is replaced by the flexible sheet onto which the conductors are deposited. In this patent, the polyimide flexible sheets are formed separately from the slider/transducer combination and then attached to each other by gluing, for instance. There is no showing of a combination transducer/slider/suspension assembly that requires no further connection step between the suspension and the slider.

It is known that the suspension arm can be formed from a polyimide material with the conductors to the transducer deposited directly on the polyimide suspension. U.S. Pat. No. 4,789,914 to Ainslie et al. and assigned to the assignee of the present invention, discloses that contact soldering can be used to connect the suspension containing the conductors directly to a slider. The transducer is already deposited on the slider. The slider includes conductor pads and interconnecting leads deposited on the slider between the conductor pads and the transducer. Again the slider and transducer are separately produced from the suspension arm and then interconnected later through contact soldering as disclosed in this patent. As with the remainder of the known prior art, the slider and transducer portion of the combination is produced separately from the suspension assembly which includes interconnecting conductors. There is no showing of a combination transducer/slider/suspension with conductors nor a method for making the combination.

Contact reading techniques have shown some great promise in recent years. Slider apparatus with a suspension made of an active material achieves contact recording by cycling the transducer down only when a read/write operation is desired. The remainder of the time the slider flies at a height above disk contact. Another approach to contact recording is a scheme in which a "flexible" head is rubbed against the disk surface. The head used in this approach is fabricated by building up a thin film of material on a substrate and then releasing the thin film. For example, U.S. Pat. No. 5,041,932 to Hamilton, assigned to Censtor Corp., discloses a low mass, integrated transducer/flexure/conductor structure for use in contact recording and reading of information. However, the "flexible" head approach requires an elaborate mounting mechanism for proper and precise control.

It has been found that a vertical transducer head achieves several advantages; the most pronounced advantage is the fabrication of the head windings along the length of the wafer. This construction accommodates a large change in the pole tip length caused by mechanical wear over the life of the file and thereby increases the life of the overall apparatus.

Unfortunately, all of these schemes have associated with them several disadvantages which limit their use and application. It is estimated that there are 400 micro inches of head wear over a typical product life. This large amount of wear restricts the applicability of many of these approaches. The pole tips in a conventional head are usually only about one micron long and wear away rapidly in this application Additionally, while the thin film fabrication allows the integration of the head onto the suspension, this arrangement requires a large amount of wafer area which reduces the head yields per wafer to a level much below conventional head production processes and below an acceptable level.

It therefore is an object of the present invention to provide a disk system and especially a transducer and suspension system that overcomes the adversities of the prior art.

It is another object of the present invention to provide an enhanced suspension and transducer element.

Another object of the present invention is to provide a low mass suspension-transducer with decreased head wear characteristics.

Yet another object is to provide a suspension-transducer assembly which is useful for contact recording.

Still another object of the present invention is to produce a thin film suspension-transducer which can be controllably activated.

Another object is to provide a recording drive that uses a thin film suspension-transducer of the present invention.

SUMMARY OF THE INVENTION

The present invention provides a disk drive assembly in which the suspension system and transducer are integrated and fabricated using thin film deposition techniques. The thin film technique produces an assembly that is very low in mass thereby permitting a choice between flying or contact recording. The integrated transducer and suspension system is made by batch processing a plurality of transducers onto a substrate in a row and column configuration. A row section of the transducers is further batch processed by forming a combination slider-suspension on each transducer. The suspension section is formed onto each transducer of the substrate row section together with the conductors for each transducer. The supporting structure for the suspension section is removed by etching or cutting, or by the removal of a release layer deposited before the suspension section is formed. The suspension section is flexible while remaining connected to a slider and its transducer. Single transducer-suspension systems can then be produced by cutting or dicing the row section into the individual units.

In fabrication of one embodiment, a wafer substrate having a thickness equal to a desired suspension length has a first release layer formed thereon. Next, a support layer is formed on the first release layer and a plurality of thin film transducers is formed on the support layer in a row and column pattern. The wafer is separated into a plurality of row sections, with each row section having one transducer from each column which forms the row section of formed thin film transducers. A second release layer is formed on a separated side on the row section separated from the obtained wafer substrate with the thin film transducer. Next, a suspension layer is formed by depositing a thin film layer of a resilient material on the second release layer. Electrically conductive lines are formed extending from both coil ends of the thin film transducer to an opposing end, a free end, of the suspension layer. Finally, the first and second release layers are dissolved leaving the suspension/transducer assembly ready for use. The resulting apparatus allows the use of a conventional transducer on a very low mass, integrated slider-suspension assembly. The apparatus can be fabricated using well established slider technology and high density thin film head production. In a second embodiment, the thickness of the substrate is made equal to the desired width of the suspension section. The thin film transducers are then deposited onto the substrate with the release layer, again in a row and column configuration. In one row section, however, the transducers are separated by a distance which will become the length of the slider. The row section is separated from the wafer substrate and the suspension layers are deposited onto the proper side of the row section. The row section is then cut, etched, diced or machined to separate the individual transducer-suspensions and then separated from the substrate by dissolving the release layer. Instead of a release layer, the transducer and suspension layers can be directly deposited onto the substrate. The substrate is the abraded away as desired by etching or sawing. In this manner, a portion of the substrate may be left to serve as a slider support for the transducers.

BRIEF DESCRIPTION OF THE DRAWINGS

The foregoing, and other objects, features and advantages of the invention, will be apparent from the following more particular description of preferred embodiments of the invention, as illustrated by the accompanying drawings, wherein:

FIG. 7A is a top view of the row of FIG. 6 with the deposition of the layers forming the suspension section according to the invention; and, FIG. 7B is a cross sectioned view of the row of transducers with a suspension section taken along lines 7B—7B of FIG. 7A;

DETAILED DESCRIPTION OF THE PREFERRED EMBODIMENTS

Figure 1:
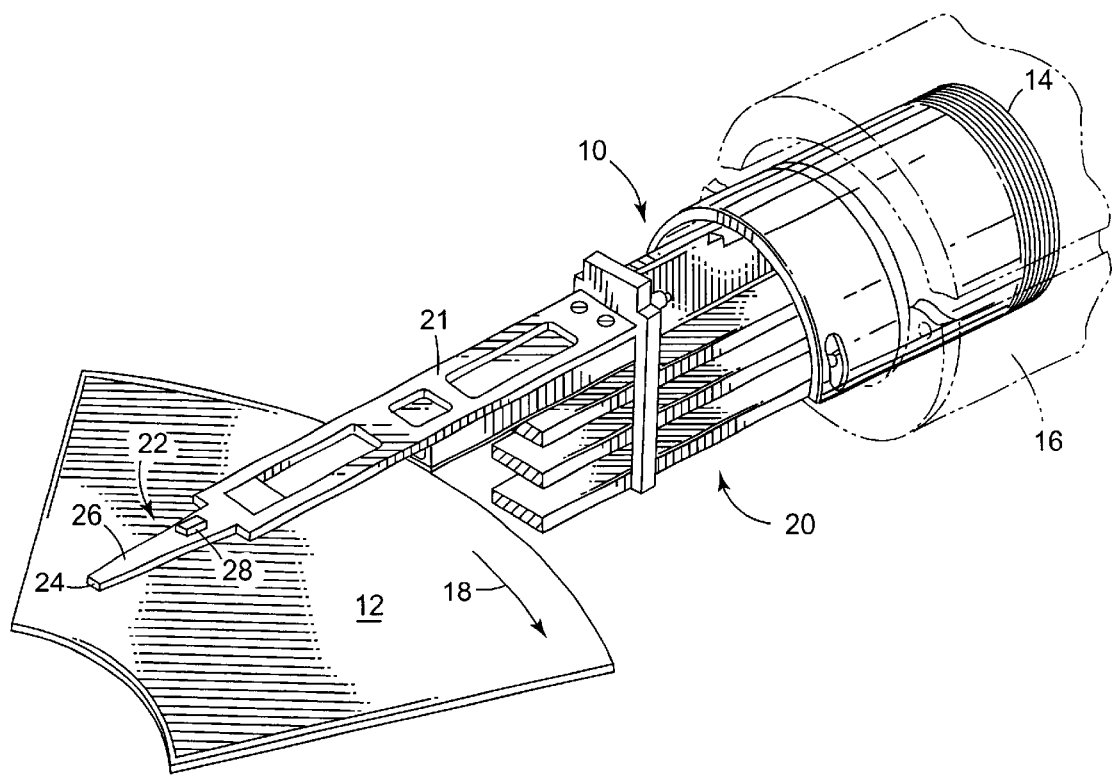
FIG. 1 is a perspective view of a combination assembly according to the present invention attached for positioning by an actuator in transducing relationship to a disk surface of a disk file.

The suspension system, slider and transducer of the present invention are integrated and fabricated using thin film deposition techniques which produce an assembly that is very low in mass. The preferred embodiments of the present invention are generally for use in the large multiple media drives but should also find use in the single media drives used generally for personal computers. The media can be either tape or disk.

A standard transducer is achieved in one embodiment by using the length of the suspension as the determining factor for the thickness of the starting wafer substrate. Additionally, the arm is optionally integrated into this structure and is capable of being modified to be active, thereby allowing dynamic loading and unloading from the disk only when contact is desired for reading/writing.

In this embodiment, a conventional transducer of well known construction is fabricated on a wafer substrate. An example of an process for fabricating a transducer on a wafer substrate useful for this application is described by the aforementioned U.S. Pat. No. 4,624,048. Transducers and associated mechanisms are well known in the art. The transducers are deposited on a relatively thick layer of alumina or other suitable material which is chosen for its ability to act as an etch stop and potential use as a slider section. Row sections are cut from the wafer and lapped to a desired measurement, a throat height for an inductive transducer, for instanced Alternatively, the measurement is defined through photolithography techniques. The top of the row sections are lapped to provide a smooth surface.

A layer of the etch stop material is deposited on the top of the row section. This step provides a bend of thick material which eventually serves as the suspension. A layer of electrically conductive material is deposited as part of the suspension and featured to provide electrodes leading from the transducer element to electronics which control the transducer element.

Another embodiment permits the depositing of a first ground plane layer before the conductor leads. A top ground plane layer provides greater stray field isolation and reduces symmetric stress due to thermal mismatches, both of which are desired in certain applications.

An etch process can be used to remove the substrate from the bulk of the slider-suspension, leaving only the suspension material and the transducer element with its associated leads. This provides an extremely lightweight suspension-transducer assembly. The removal of the substrate can be achieved through the use of release layers. The initial substrate is coated with a release layer so that the deposited films, as discussed above, are readily released at the final step. Still another approach is to grind or etch the appropriate thickness of material from the row section leaving the desired structure. Adapting the leads to "bend" around the corner to connect to the transducer can be accomplished using a variety of techniques. One approach is to terminate the electrodes so that in the grinding stage, the edges are exposed permitting subsequent deposition from the top to connect thereto. If the top edge of the transducer head surface is rounded, this task is facilitated. The suspension section is selectively stiffened by any of several techniques. Stiffening of the suspension may be desired in specific applications or to accommodate the dynamics of the system.

This stiffening is preferably accomplished by varying the thickness profile of the suspension itself. The variance in thickness adds little to the overall mass and provides highly controlled stiffening properties. Anisotropic stiffness is accomplished through the use of corrugations.

Recesses in the substrate also are used to define areas for automatic alignment with similarly shaped parts. This permits the number of transducer elements manufactured on a single wafer to be increased through the use of tiny chiplets. These chiplets are bonded onto the larger suspension and a recession in the shape of the chiplet is provided for automatic alignment of the chiplet to the suspension.

The low stiffness of the suspension assembly permits easy attachment to an actuator arm. To avoid any problem with stiction, the slider and transducer can be normally unloaded from contact with the disk by making the arm or the suspension section from an active material. The slider and its transducer are placed into contact with the disk at a desired force level by activating the active material.

Referring now to FIG. 1, a disk file system embodying the present invention comprising a linear actuator 10 and a segment of an associated disk 12 of a data recording disk file is illustrated. The linear actuator 10 includes a voice coil motor 14. The voice coil motor 14 includes a coil movable within the magnetic field of a fixed permanent magnet assembly (not shown) having a core and an outer structure supported by a housing 16. An actuator arm 20 is attached to the movable coil 14. Attached to the other end of the actuator arm 20 is a plurality of arms 21, each of which support a combination transducer-slider-suspension assembly 22 produced according to the procedure set forth herein. The assembly 22 includes a transducer-slider 24 and a suspension section 26. The suspension section 26 can support the transducer-slider 24 above the surface of the disk 12 on a bearing or cushion of air generated by the rotation of the disk 12. If desired, the suspension section 26 can support the transducer-slider 24 in contact with the disk media. The air bearing or air bearing surface refers to the surface of the slider parallel and adjacent to the disk surface. It includes both configurations where the slider is designed to fly above the disk, and where the slider is designed to contact the surface of the recording media, the disk 12, during operation.

The actuator arm 20 includes a plurality of the arms 21 with each arm 21 supporting the combination assembly 22, each combination assembly 22 associated with each surface of the disk 12. Therefore, disk 12 also has a combination assembly 22 mounted to an arm 21 of the actuator arm 20 on the underside of the disk 12. Further, other combination assemblies are associated with the top and bottom sides of other disks, the transducer access of which is controlled by the actuator 10.

The suspension section 26 of the combination transducer-slider-suspension assembly 22 provides a load to the transducer-slider assembly 24 which is generally perpendicular to the surface of the disk 12. This perpendicular load maintains the transducer-slider assembly 24 in contact with the data surface of the disk 12 when the disk 12 is not rotating. During rotation of the disk 12, the air bearing generated between the transducer-slider assembly 24 and the disk 12 opposes the perpendicular load applied to the transducer-slider assembly 24 by the suspension section 26.

During operation, the transducer-slider assembly 24 is moved to the desired track of the concentric data tracks on the data surface of the disk 12 by activating the voice coil motor 14. Rapid transfer of the transducer-slider assembly 24 from one track to another track for read or write operations is required. It is necessary that the transducer of the assembly 24 be properly positioned over the desired track and reach that track in a minimum amount of time. The actuator 10 illustrated in FIG. 1 is a linear actuator which moves the combination assembly 22 in a precise direction transverse to the tracks. Other types of conventional disk files utilize a rotary actuator such as is shown in the aforementioned U.S. Pat. No. 3,849,800 and in FIG. 2. The rotary actuator moves the combination assembly of the present invention in an arcuate path which is only generally in the radial direction and is a substitute for the linear actuator 10.

The combination assembly 22 must provide radial stiffness, and have substantial flexibility in the pitch and roll directions as it rides on the air bearing above the data surface of the disk 12. If desired, an integrated circuit assembly 28 may also be produced on the suspension section 26 of the combination assembly 22. The integrated circuit amplifier is shown symbolically in reference numeral 28 and will be described as the description proceeds as a further embodiment of the present invention.

Figure 2:
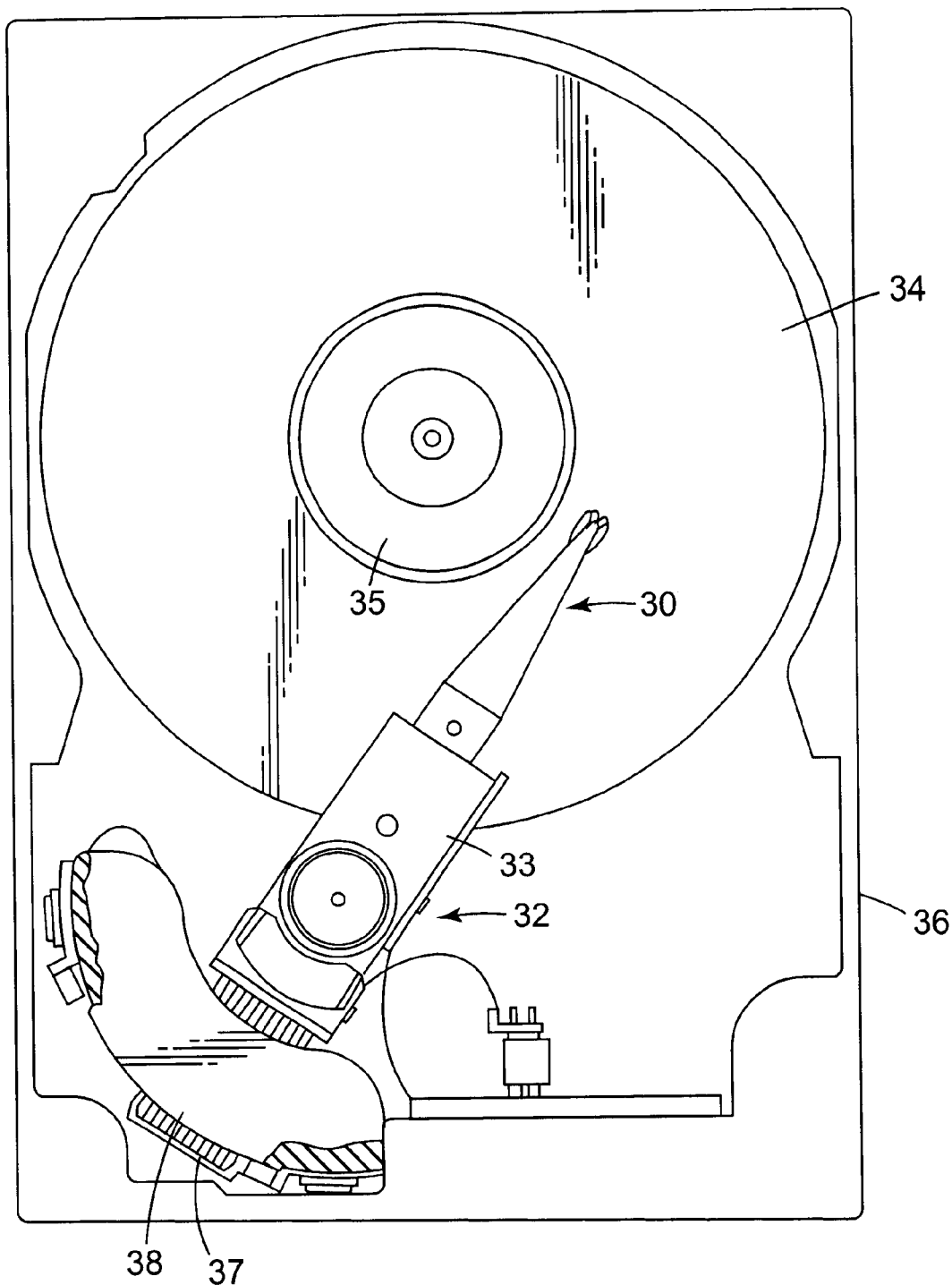
FIG. 2 is a top view of a magnetic recording mechanism with a rotary actuator and employing the present invention.

FIG. 2 illustrates a data recording disk file including a rotary actuator 32 and an associated disk 34 rotated by a drive means 35, all mounted within a housing 36. The rotary actuator 32 moves a combination assembly of the present invention in an arcuate path over the disk 34. The rotary actuator 32 includes a voice coil motor, which is a coil 37 movable within the magnetic field of a fixed permanent magnet assembly having a core 38. An actuator arm 33 is attached to the movable coil 37. The other end of the actuator arm 33 is attached to a combination transducer-suspension assembly 30 of the present invention and produced according to the procedure set forth herein.

Figure 3A:
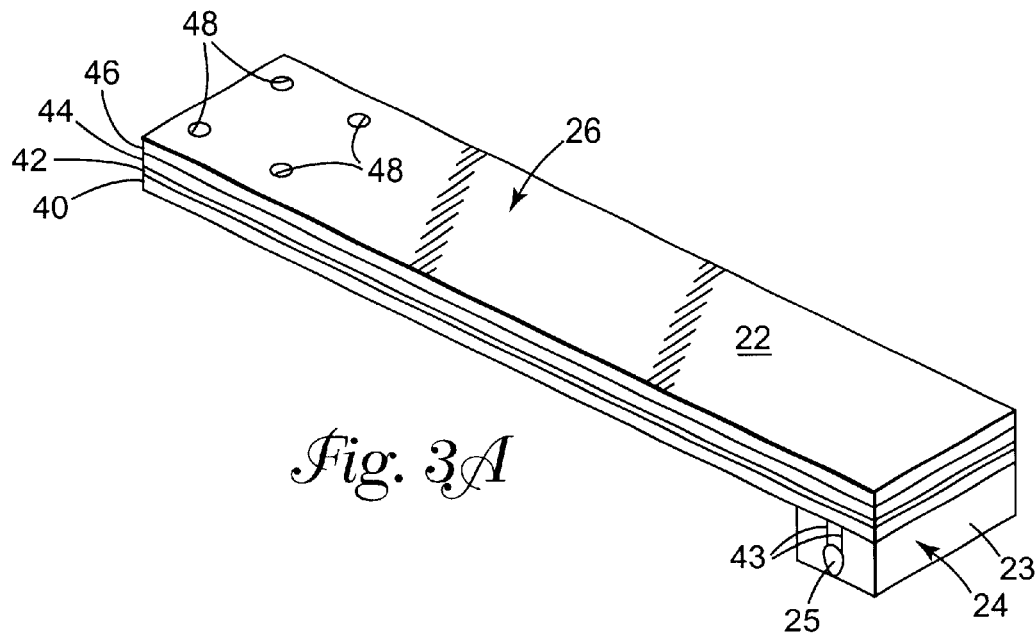
FIG. 3A is a perspective view of one embodiment of a combination transducer-suspension according to the invention for use as the combination assembly with the disk file as shown in FIG. 1.

An enlargement of the combination assembly 22 for use with the disk file of FIG. 1 is shown in FIG. 3A. The suspension section 26 is deposited over an entire section of a wafer as will be described later. A portion of the wafer becomes the slider 23 of the transducer-slider assembly 24. While one transducer 25 is shown formed on the slider 23, it is contemplated that more than one transducer may be formed and used for operation with the track of the disk 12. Generally, two or more transducers 25 are deposited in order to increase the yield since only one transducer 25 need be in operation to produce a workable combination assembly 22.

The suspension section 26 may include an insulation layer 40, a conductive circuitry layer 42, a dielectric layer 44, and a structural suspension layer 46. The structural suspension layer could be the dielectric layer 44, made of alumina for instance, or could be a separate dielectric layer, again of alumina, for instance. The structural suspension may also be made of a plated nickel-iron alloy, a sputtered beryllium copper layer, or a sputtered stainless steel layer. Conductor leads 43 interconnect the transducer 25 to the conductor circuitry layer 42. Electrical connection pads 48 are provided at the termination of the conductor circuitry layer 42 to interconnect with an external amplifier. The external amplifier could be an integrated circuit amplifier, such as integrated circuit amplifier 28, (see FIG. 1), which can be deposited together with other layers that are used in the suspension section 26. The insulation layer 40 provides electrical insulation between the conductor layer 42 and the possibly conductive substrate of the slider 23. The dielectric layer 44 provides insulation for the conductive circuit 42 from the metal structural suspension layer 46. One or more ground plane layers may also be provided if needed. The dielectric layer 44 either alone or together with any structural suspension layer 46 provides the suspension support which holds the combination assembly 22 in position over the track of the disk 12. As stated previously, the suspension section 26 must hold the transducer-slider section 24 in place over the disk 12. The suspension section allows the pitch and roll motion to enable the transducer-slider section 24 to follow the surface of the disk 12 while preventing the yaw motion which would possibly place the transducer 25 out of the transverse position relative to the tracks.

Figure 3B:
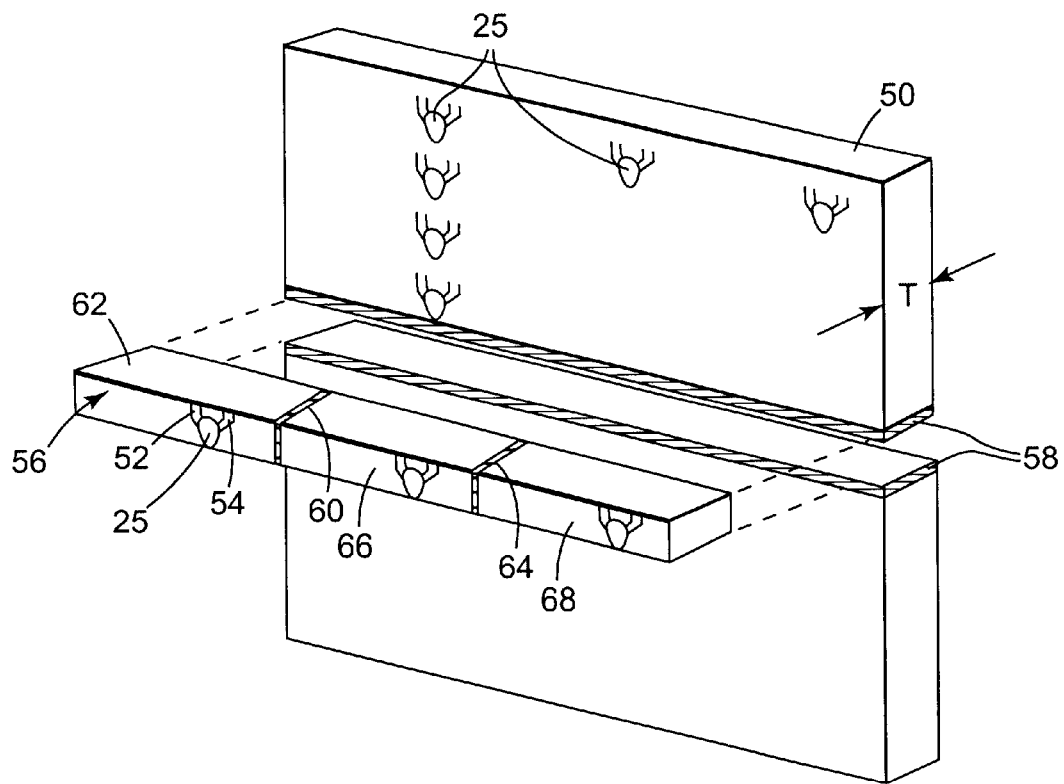
FIG. 3B is a perspective view of a substrate with a plurality of magnetic transducers formed thereon in rows and columns for use in the process to build the combination assembly as shown in FIG. 3A.
Figure 4A:
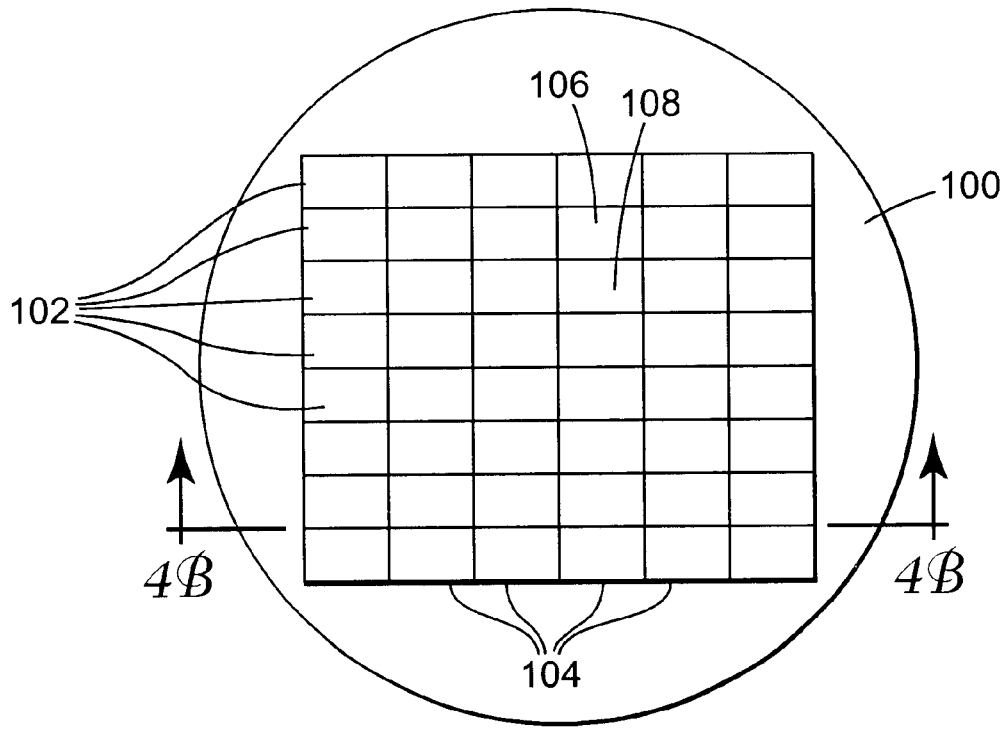
FIG. 4A is a top view of a wafer substrate showing the layout of the transducers in a row and column configuration as shown in FIGS. 3B on a round wafer.

FIG. 3B shows the first steps in the method of forming the combination assembly 22 according to the first embodiment for use in the disk file configuration as FIG. 1. The batch fabrication of the thin film transducers 25 is accomplished by preparing a non-magnetic wafer substrate 50. The substrate 50 has a thickness T which, when added to the thicknesses of the deposited thin film transducer 25, will equal to the width of the suspension assembly 26 and the length of the slider 23. The transducer 25 can be the thin film inductive transducer as shown in the aforementioned U.S. Pat. No. 4,190,872 or the magnetoresistive transducer as shown in the aforementioned U.S. Pat. No. 3,975,772. The transducer 25 includes conductor leads 52 and 54 for the activation of the transducer for reading and writing to and from the magnetic media. The transducers 25 are deposited onto the substrate 50 in a row and column configuration as is shown in FIG. 4A. The row and column configuration is best described by referring to FIG. 4A before continuing the description of the process according to the present invention.

Figure 4B:
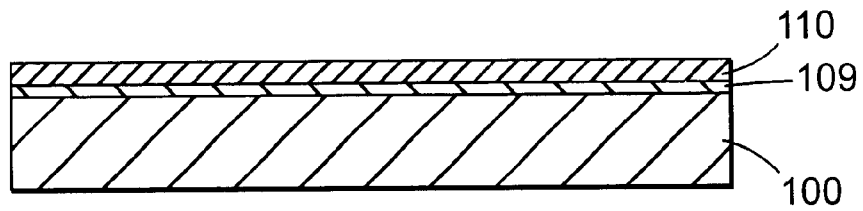
FIG. 4B is a cross sectioned view of the substrate taken along lines 4B—4B of FIG. 4A.

In FIG. 4A, a round wafer substrate 100 is shown having a plurality of the transducers 25, for instance, deposited thereon in a plurality of rows 102 and a plurality of columns 104. The wafer 100 is shown with a plurality of blocks such as block 106 and 108, with each block signifying one transducer. It is known that any number of rows 102 and columns 104 can be produced on a single wafer substrate 100. The number is dependent on the size of the wafer and on the size of the individual combination assemblies. As shown in FIG. 4B, the substrate 100 includes a release layer 109 formed between the substrate 100 and a layer 110. The layer 110 in this instance represents the layers that form the transducers 25.

Thus referring back to FIG. 3B, on the substrate 50 each transducer 25 forms one block. After the deposition of the layers that form the transducer 25, the substrate 50 is separated into rows by sawing or otherwise dicing, one row 56 is shown separated from the substrate 50 through saw cuts 58. Later in the process, the row 56 will be separated by a cut 60 to produce a block 62 containing one transducer section 25. A further cut 64 will then completely separate the row 56 into its individual blocks 66 and 68, three blocks being illustrated in FIG. 3B per row. A saw cut 58 is shown for the cut 64. The individual blocks may also be separated by etching, machining, or dicing, for instance. In the process according to the present invention, before the layers 110 of the transducers 25 are formed on the substrate 100, a release layer 109 is deposited The purpose of the release layer 109 will be described below with reference to FIG. 7B.

Figure 5A:
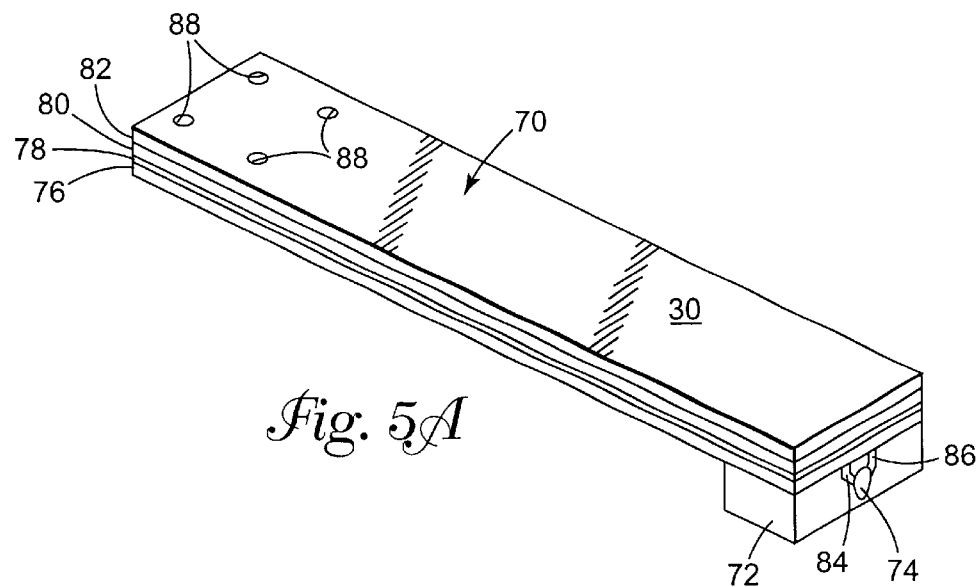
FIG. 5A is a perspective view of a second embodiment of a combination assembly according to the invention for use in the disk file shown in FIG. 2.

An enlargement of the combination assembly 30 for use with the rotary actuator 32 of the disk file of FIG. 2 is shown in FIG. 5A. A suspension section 70 is deposited over an entire section of a row as will be described later in FIG. 5B. A portion of the wafer can become a slider 72 of the combination assembly 30. While one transducer 74 is shown formed on the slider 72, it is contemplated that more than one transducer may be formed and used for operation with the track of the disk 34.

The suspension section 70 may include an insulation layer 76, a conductor layer 78, a dielectric layer 80, and a structural suspension layer 82 which could be a sputtered beryllium copper layer or a sputtered stainless steel layer. Conductor leads 84 and 86 interconnect the transducer 74 to the conductor circuitry layer 78. Electrical connection pads 88 are provided at the termination of the conductor layer 78 to interconnect with an amplifier. The amplifier could be an integrated circuit amplifier deposited together with the layers used in the suspension section 26 of FIG. 7B. The insulation layer 76 provides electrical insulation between the conductor layer 78 and the possibly electrical conductive substrate of the slider 72. The dielectric layer 80 can provide insulation if necessary for the conductive layer 78. One or more ground plane layers may also be provided if needed. The dielectric layer 80 together with any structural suspension layer 82 is basically included to provide the suspension support which holds the combination assembly 30 in position over the track of the disk 34.

Figure 5B:
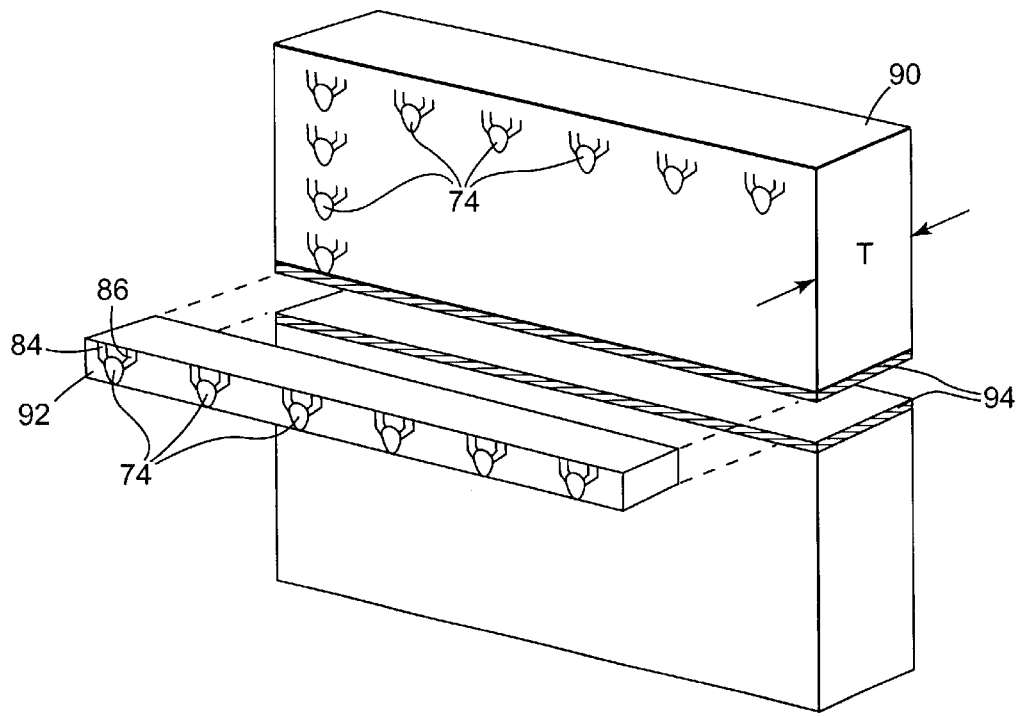
FIG. 5B is a perspective view of a substrate with a plurality of magnetic transducers formed thereon in rows and columns for use in the process to build the combination assembly as shown in FIG. 5A.

FIG. 5B shows the first steps in the method of forming the combination assembly 30 according to the second embodiment for use in the disk file configuration as FIG. 2. The batch fabrication of the thin film transducers 74 is accomplished by preparing a non-magnetic wafer substrate 90. The substrate 90 has a thickness T which, when added to the thicknesses of the deposited thin film transducers 74, will equal the length of the suspension section 70. Each transducer 74 can be the thin film inductive transducer as shown in the aforementioned U.S. Pat. No. 4,190,872 or the magnetoresistive transducer as shown in the aforementioned U.S. Pat. No. 3,975,772. Each transducer 74 includes the conductor leads 84 and 86 for the activation of the transducer for reading and writing to and from the magnetic media. The transducers 74 are deposited onto the substrate 90 in a row and column configuration as is shown in FIG. 4A. The row and column configuration has been described with reference to FIG. 4A and will not be further described here.

A formation of the combination assembly 30 according to the present invention continues with the discussion of FIG. 5B. After the deposition of the transducers 74, the substrate 90 is cut into a plurality of row sections, one row section 92 being shown separated from the wafer substrate 90 by cuts 94. Each row including a plurality of the transducers 74. A further perspective view of the row section 92 is shown in FIG. 6.

Figure 6:
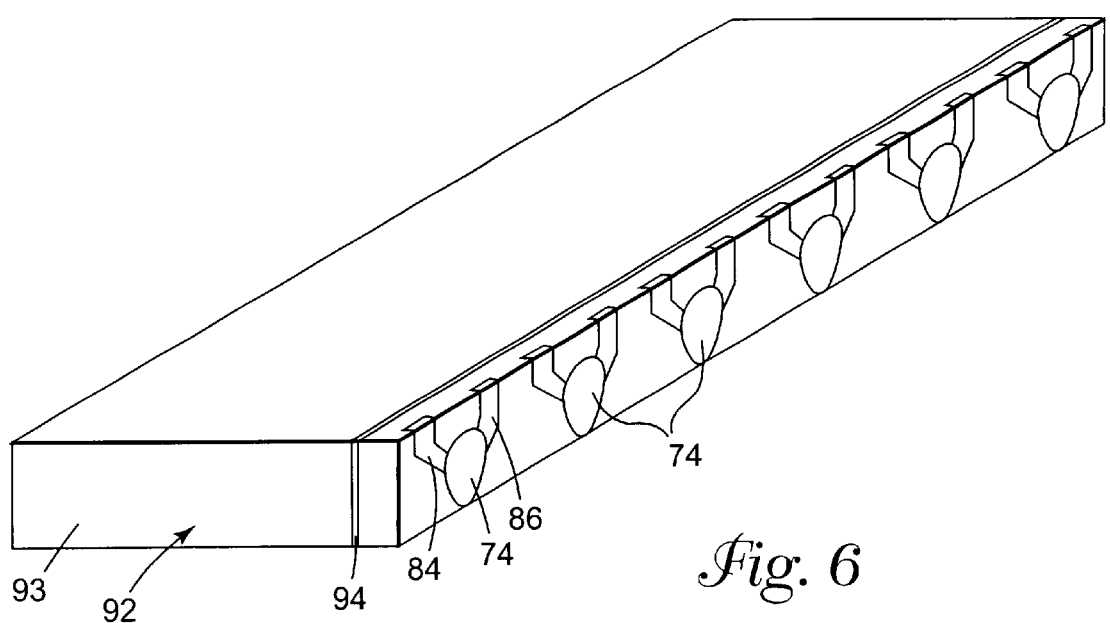
FIG. 6 is a perspective view of a row taken from the wafer as shown in FIG. 5B.

Referring to FIG. 6, in the processing of the transducers 74 and their lead conductors 84 and 86 a release layer 94 is first deposited separating the layer of the transducers 74 from the wafer substrate. The row 92 of FIG. 6 is then processed as is shown in FIG. 5A. The layers of the suspension section 70 are deposited on the top of the substrate portion of the row 92. A more detailed description of one preferred embodiment for the formation of the suspension section 70 on the row 92 and transducers 74 is given below with reference to FIGS. 7A and 7B.

Referring now to FIGS. 7A and 7B, in this embodiment the suspension section 70 is separated from a substrate section 93 of the row section 92 by a release layer 96. The release layer 96 is of the same or similar material as used for the release layer 94. An acceptable release layer is plated nickel-iron. Other possible release layer materials include copper or chromium.

Onto the release layer 96 are formed the layers of the suspension section 70. The layers can be as shown in FIG. 5A. Studs 97 and 98 connect the conductor leads 84 and 86 to the conductors of the conductor layer. If desirable, ground planes can be included as is shown in FIG. 7B. In FIG. 7B, the insulation layer 76 is deposited onto the release layer 96. A first ground plane layer 99 can be deposited on the insulation layer 76. Another insulation layer 76A is then deposited on the ground plane layer 99. The conductor layer 78 is then deposited, it being evident that the conductor layer 78 includes a plurality of conductors, at least two for each transducer such as conductors 78A and 78B of FIG. 7A. A suspension support layer 81 provides the leaf spring-like support for the combination assembly and can comprise the layers 80 and 82 of FIG. 5A. A further ground plane (not shown) can be deposited on top of another insulation layer deposited on the conductor layer 78. The top ground plane provides greater isolation and symmetric stress due to thermal mismatches and both are desired in certain applications. A stud 89 connects the conductors of the conductive layer 78 to the connection pads 88 of FIG. 5A, only two are shown in FIG. 7A.

Note that the suspension section 70 and the transducer section 72 overlap and bond to each other without an interposed release layer. This step provides a bend of thick material. Utilizing the release layers 94 and 96 permits removing the substrate 93 of the row section 92 from the combination assembly, leaving only the suspension section 70 and any support layers for the transducers 72 with their associated leads. An extremely lightweight suspension system is thereby produced complete with transducers.

Removal of the release layer, nickel-iron for instance, is readily accomplished using ammonia persulfate, for instance, which does not attack the alumina generally used in the process for providing the transducers.

Stiffening of the suspension system can be accomplished by varying the thickness profile of the suspension section 70 for instance. In the illustration in FIGS. 7a and 7B, the suspension section 70 is uniform in thickness, but, in some applications, it is required that the profile be varied to accommodate the specific application. Anisotropic stiffness can be accomplished through the use of corrugated portions along the length of the suspension section 70, for instance.

Figure 8:
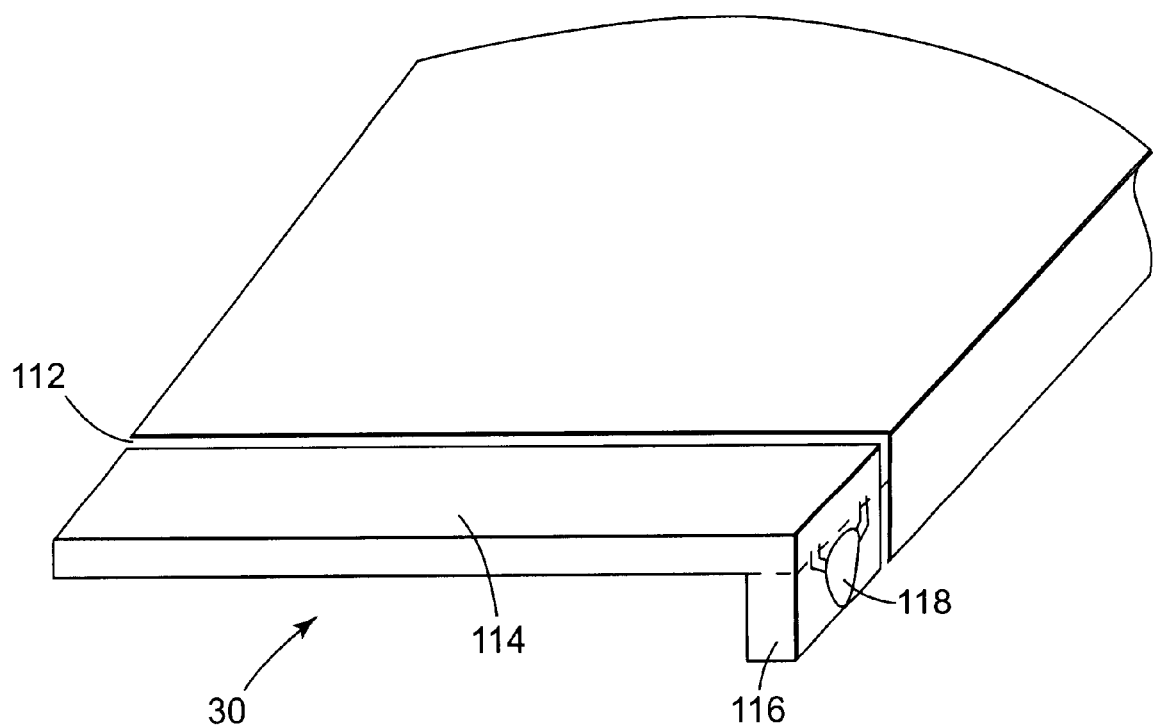
FIG. 8 is a side view illustrating a row of the combination assembly when the substrate has been removed from the suspension and transducer elements of FIGS. 7A and B.

FIG. 8 shows a completed row section with the unwanted and excess substrate portions removed. A saw cut 112 will separate one combination assembly 30 from the row section leaving the combination assembly with its own suspension section 114, its own slider portion 116, and its own transducer 118. Further cuts will then separate the remaining combination assemblies. Once the combination assembly has been so manufactured, its incorporation into a rigid disk reader is easily accomplished and is obvious to those of ordinary skill in the art. One such disk reader is illustrated in U.S. Pat. No. 3,849,800.

In an embodiment of the suspension to provide for placement of the transducer adjacent to the media only when desired, the suspension has an active material device formed thereon. This active material device may be one of several devices known to those in the art including, but not limited to, a piezoelectric device, an electrostrictor device, or a heater. The active material device controls the suspension itself so that contact by the read/write transducer is easily effected. Still other embodiments utilize the suspension for containing the electrical strip lines for communicating with the transducer. By varying the thickness of the suspension, selective stiffening of the suspension is easily accomplished. This attribute permits the suspension to be modified to fit particular applications.

Another approach to the removal of the substrate of a row section including the deposited transducers is through grinding or otherwise etching away the substrate. In this approach using FIG. 7B as an example, the release layers 94 and 96 are not used, rather the excess substrate 93 is removed through grinding or other suitable ablation process. Through this process, a portion of the substrate can remain as a base support, a slider section, for the transducers 72. This method could be especially useful if there is a requirement that the transducers be suspended by a cushion of air to fly above the magnetic media of the disk.

The approach described herein allows for production of suspension-slider-transducer combination assemblies having very high yield rates. Adjacent systems can be separated by patterning the thin film depositions through photolithography, thus eliminating the usual saw kerf allowances. Similarly the throat height of the thin film heads is defined lithographically since only the thickness of the suspension system material is required to be milled or etched at the desired length.

While the invention has been particularly shown and described with reference to preferred embodiments thereof, it will be understood by those skilled in the art that various changes in form and detail may be made therein without departing from the spirit and scope of the invention. For instance, a transducer may be produced onto the wafer such as is described in U.S. Pat. No. 4,190,872, assigned to the assignee of the present invention. The wafer may be made of material such as is the subject matter of the Jacobs U.S. Pat. No. 4,251,841. The suspension section according to the preferred embodiments could be any of several configurations such as a dual layer of a polyimide material and a metal layer formed thereon to provide sufficient resiliency and stiffness as required by a suspension assembly. It should be noted that the suspension assembly could be produced in a single layer if the correct thickness and stiffness were obtained in the single layer. It is also well understood that many electrically conductive materials are available to form the conductive circuitry and the transducer leads. Copper or gold is the preferred material but many others are available as is well known in the art. While air bearing surface sliders are discussed herein, the present invention also includes contact recording sliders wherein the air bearing surface of the slider is any suitable surface that can be placed in contact with the media during operation. Horizontal transducers are shown in the preferred embodiment. However this invention is also applicable to vertical transducers wherein the slider-suspension combination is produced by the disclosed process without the transducer. The vertical style transducer is produced separately and then bonded to the slider-suspension combination. The invention claimed herein is set forth in the following claims.

What is claimed is:

1. A data storage device comprising:
   a housing;
   at least one data storage disk rotatably mounted in said housing having means for storing data in tracks provided thereon;
   means for rotating said data storage disk in said housing;
   an actuator arm positioned in said housing in proximity to said data storage disk;
   an integrated thin film slider and transducer formed in its entirety by a process of thin film deposition and having thin film lead layers for activating said thin film transducer;
   a thin film suspension formed in its entirety by a process of thin film deposition of a predetermined length, a length portion at a first end of said suspension being deposited on said integrated thin film slider and transducer, said thin film suspension being attached at a second end to said actuator arm such that said integrated thin film slider and transducer is positioned proximate to said data storage disk, said thin film suspension including thin film conductor layers extending from said second end of said thin film suspension to said first end and electrically connected to said lead layers of said integrated thin film slider and transducer by thin film deposition; and
   each of the integrated thin film slider and transducer and the thin film suspension consisting essentially of a plurality of thin film layers, all of the thin film layers of the integrated thin film slider and transducer extending substantially perpendicular to the thin film layers of the thin film suspension.

2. The data storage device according to claim 1 further including an active material device formed on said thin film suspension.

3. A data storage device according to claim 1 further including an integrated circuit amplifier formed on said thin film suspension electrically connected to said thin film conductor layers.

4. A combination assembly comprising:
   an integrated thin film slider and transducer formed in its entirety by a process of thin film deposition and having thin film lead layers for activating said thin film transducer;
   a thin film suspension formed by a process of thin film deposition of a predetermined length, a length portion at a first end of said thin film suspension being deposited on said integrated thin film slider and transducer, said thin film suspension including thin film conductor layers extending from a second end of said thin film suspension to said first end and electrically connected to the thin film lead layers of said integrated thin film slider and transducer by thin film deposition; and
   each of the integrated thin film slider and transducer and the thin film suspension consisting of a plurality of thin film layers, all of the thin film layers of the integrated thin film slider and transducer extending substantially perpendicular to the thin film layers of the thin film suspension.

5. A transducer/suspension assembly comprising:
   a thin film slider and transducer formed entirely by thin film deposition and having a plurality of thin film layers including a thin film support layer, a thin film gap layer and thin film lead layers, a thickness of the thin film gap layer forming a gap length;
   each of said plurality of thin film layers of the thin film slider and transducer having first and second thin film surfaces bounded by top and bottom edges and a pair of side edges, the bottom edges of the thin film layers forming an air bearing surface;
   an elongated thin film suspension formed by thin film deposition of a plurality of thin film layers, each thin film layer having top and bottom thin film surfaces which are bounded by front and rear edges and a pair of side edges; and
   a front portion of a bottom thin film surface of at least one thin film layer of the thin film suspension formed directly on the top edges of thin film layers of the thin film slider and transducer by said thin film deposition to form said elongated thin film suspension with thin film surfaces of said thin film layers of the suspension extending substantially perpendicular to the thin film surfaces of the thin film slider and transducer and being bonded to top edges of the thin film layers of the thin film slider and transducer by thin film deposition.

6. A data storage device including the transducer/suspension assembly as claimed in claim 5, the data storage device comprising:

a housing;

at least one data storage disk rotatably mounted in said housing having means for storing data in tracks provided thereon;

means for rotating said data storage disk in said housing;

an actuator arm mounted in said housing in proximity to said data storage disk; and the thin film suspension being mounted on a distal end of the actuator arm.

7. A transducer/suspension assembly as claimed in claim 5 including:

the thin film slider and transducer having front and rear thin film surface walls which have substantially the same area.

8. A transducer/suspension assembly as claimed in claim 5 including: =p1 the bottom surface of the slider and the thin film transducer forming an air bearing surface; and =p1 the top and bottom surfaces of the thin film suspension being substantially to the air bearing surface.

9. A transducer/suspension assembly as claimed in claim 7 comprising:

the front edges of the thin film layers of the thin film suspension lying contiguously in a common front wall plane; and the front thin film surface wall of the thin film slider and transducer being contiguous with said common front wall plane of the suspension.

10. A transducer/suspension assembly as claimed in claim 5 including:

the thin film suspension having first and second thin film conductor leads formed by thin film deposition; and a terminal end of each of the first and second thin film lead layers of the thin film transducer being connected to a respective terminal end of the first and second thin film conductor leads of the thin film suspension by thin film deposition.

11. A transducer/suspension assembly as claimed in claim 10 including:

the thin film suspension having top and bottom thin film insulation layers formed by thin film deposition; and the thin film conductor leads of the thin film suspension being located between the top and bottom thin film insulation layers.

12. A transducer/suspension assembly as claimed in claim 11 including:

the top and bottom surfaces of the thin film layers of the thin film suspension being substantially parallel to the air bearing surface.

13. A transducer/suspension assembly as claimed in claim 12 comprising:

the front edges of the thin film layers of the thin film suspension lying contiguously in a common front wall plane; and the front thin film surface wall of the thin film slider and transducer being contiguous with said front wall plane of the suspension.

14. A transducer/suspension assembly as claimed in claim 13 including:

at least one of the sidewalls of the suspension being a cut surface formed by a process of cutting.

15. A data storage device including the transducer/suspension assembly as claimed in claim 14, the data storage device comprising:

a housing;

at least one data storage disk rotatably mounted in said housing having means for storing data in tracks provided thereon;

means for rotating said data storage disk in said housing;

an actuator arm mounted in said housing in proximity to said data storage disk; and the thin film suspension being mounted on a distal end of the actuator arm.

16. A transducer/suspension assembly as claimed in claim 15 including:

an integrated circuit amplifier mounted on the thin film suspension and electrically connected to the thin film conductor leads of the thin film suspension.

17. A transducer/suspension assembly as claimed in claim 16 including:

an active material device mounted on said thin film suspension.

18. A transducer/suspension assembly as claimed in claim 17 including:

the thin film suspension having a third thin film insulation layer located between the first and second thin film insulation layers;

the thin film conductor leads of the thin film suspension being sandwiched between the top thin film insulation layer and the third thin film insulation layer; and the thin film suspension having a thin film ground plane layer which is sandwiched between the bottom thin film insulation layer and the third thin film insulation layer.

19. A data storage device including the transducer/suspension assembly as claimed in claim 18 the data storage device comprising:

a housing;

at least one data storage disk rotatably mounted in said housing having means for storing data in tracks provided thereon;

means for rotating said data storage disk in said housing;

an actuator arm mounted in said housing in proximity to said data storage disk; and the thin film suspension being mounted on a distal end of the actuator arm.

20. A transducer/suspension assembly as claimed in claim 19 including:

an integrated circuit amplifier mounted on the thin film suspension and electrically connected to the thin film conductor leads of the thin film suspension.

21. A transducer/suspension assembly as claimed in claim 20 including:

an active material device mounted on said thin film suspension.

22. A transducer/suspension assembly as claimed in claim 21 including:

the thin film suspension having a third thin film insulation layer located between the first and second thin film insulation layers;

the thin film conductor leads of the thin film suspension being sandwiched between the top thin film insulation layer and the third thin film insulation layer; and the thin film suspension having a thin film ground plane layer which is sandwiched between the bottom thin film insulation layer and the third thin film insulation layer.

23. A transducer suspension assembly consisting essentially of:
- an integrated thin film slider and transducer;
- a thin film suspension;
- each of the integrated thin film slider and transducer and the thin film suspension consisting essentially of a plurality of thin film layers, the thin film layers of the integrated thin film slider and transducer extending substantially perpendicular to the thin film layers of the thin film suspension;
- the thin films of the integrated thin film slider and transducer having top and bottom edges;
- the thin film suspension being formed directly on the top edges of the thin film layers of the integrated thin film slider and transducer and extending therefrom; and
- the bottom edges of the integrated thin film slider and transducer forming an air bearing surface.

24. A data storage device including the transducer/suspension assembly as claimed in claim 23, the data storage device comprising:
- a housing;
- at least one data storage disk rotatably mounted in said housing having means for storing data in tracks provided thereon;
- means for rotating said data storage disk in said housing;
- an actuator arm mounted in said housing in proximity to said data storage disk; and
- the thin film suspension being mounted on a distal end of the actuator arm.

25. A transducer suspension as claimed in claim 23 including:
- the integrated thin film slider and transducer including a thin film lead layer and the thin film suspension including a thin film conductor layer; and
- the thin film conductor layer of the suspension being connected to the thin film lead layer of the integrated thin film slider and transducer by thin film deposition.

26. A transducer suspension assembly as claimed in claim 25 including:
- the integrated thin film slider and transducer having front and rear thin film walls which have substantially the same area.

27. A data storage device including the transducer/suspension assembly as claimed in claim 25, the data storage device comprising:
- a housing;
- at least one data storage disk rotatably mounted in said housing having means for storing data in tracks provided thereon;
- means for rotating said data storage disk in said housing;
- an actuator arm mounted in said housing in proximity to said data storage disk; and
- the thin film suspension being mounted on a distal end of the actuator arm.

28. An integrated suspension/slider/transducer assembly comprising:
- a suspension;
- an integrated slider and transducer mounted on the suspension, the integrated slider and transducer having an air bearing surface;
- each of the suspension and the integrated slider and transducer consisting essentially of a plurality of thin film layers formed by layer upon layer of thin film depositions;
- each thin film layer having first and second thin film layer surfaces which are bounded by first and second edge surfaces and first and second side surfaces; and
- the air bearing surface of the integrated slider and transducer consisting of only second edge surfaces of the thin film layers of said integrated slider and transducer, wherein an end portion of the thin film layer surface of one of the thin film layers of the suspension is formed directly on the first edges of the thin film layers of the integrated slider and transducer.

29. An integrated assembly as claimed in claim 28 including:
- the integrated slider and transducer including a thin film lead layer and the suspension including a thin film conductor layer; and
- the thin film conductor layer being connected to the thin film lead layer.

30. An integrated assembly as claimed in claim 28 including:
- the integrated slider and transducer having front and rear walls which are the same size; and
- each of the front and rear walls being formed by one of the thin film layer surfaces of a respective thin film layer of the integrated slider and transducer.

31. An integrated assembly as claimed in claim 28 including:
- a plurality of said edge surfaces of the thin film layers of the suspension lying in a common plane with said front wall of the integrated slider and transducer.

32. An integrated assembly as claimed in claim 31 including:
- the integrated slider and transducer having front and rear walls which are the same size; and
- each of the front and rear walls being formed by one of the thin film layer surfaces of a respective thin film layer of the integrated slider and transducer.

33. An integrated assembly as claimed in claim 32 including:
- the integrated slider and transducer including a thin film lead layer and the suspension including a thin film conductor layer; and
- the thin film conductor layer being connected to the thin film lead layer.

34. An integrated assembly as claimed in claim 33 including:
- a thin film layer surface of a transducer of the integrated slider and transducer forming said front wall of the integrated slider and transducer.

35. A data storage device including the transducer/suspension assembly as claimed in claim 34, the data storage device comprising:
- a housing;
- at least one data storage disk rotatably mounted in said housing having means for storing data in tracks provided thereon;
- means for rotating said data storage disk in said housing;
- an actuator arm mounted in said housing in proximity to said data storage disk; and
- the thin film suspension being mounted on a distal end of the actuator arm.

* * * * *